US012736032B2

(12) United States Patent
Heijne et al.

(10) Patent No.: US 12,736,032 B2
(45) Date of Patent: Sep. 15, 2026

(54) SMA ACTUATOR ASSEMBLY

(71) Applicant: CAMBRIDGE MECHATRONICS LIMITED, Cambridge (GB)

(72) Inventors: Nicolas Heijne, Cambridge (GB); Andrew Benjamin Simpson Brown, Cambridge (GB); James Howarth, Cambridge (GB); Adam South, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 419 days.

(21) Appl. No.: 18/279,114

(22) PCT Filed: Mar. 29, 2022

(86) PCT No.: PCT/GB2022/050775
§ 371 (c)(1),
(2) Date: Aug. 28, 2023

(87) PCT Pub. No.: WO2022/208066
PCT Pub. Date: Oct. 6, 2022

(65) Prior Publication Data

US 2024/0133366 A1 Apr. 25, 2024
US 2024/0229778 A9 Jul. 11, 2024

(30) Foreign Application Priority Data

Mar. 29, 2021 (GB) ..................................... 2104391

(51) Int. Cl.
*F03G 7/06* (2006.01)
*G02B 7/02* (2021.01)
*G02B 27/64* (2006.01)

(52) U.S. Cl.
CPC ......... *F03G 7/06143* (2021.08); *F03G 7/067* (2021.08); *G02B 7/021* (2013.01); *G02B 27/646* (2013.01); *G03B 2205/0076* (2013.01)

(58) Field of Classification Search
CPC .... G03B 2205/0076; G03B 2205/0007; G03B 2205/0046; F03G 7/0614; F03G 7/06143; F03G 7/067; G02B 27/646; H04N 23/687
See application file for complete search history.

(56) References Cited

U.S. PATENT DOCUMENTS 8,073,320 B2 * 12/2011 Topliss .................... G03B 3/10 396/133
2006/0272328 A1 * 12/2006 Hara ..................... H04N 23/54 60/527
2018/0171991 A1 * 6/2018 Miller .................... F16F 15/06

FOREIGN PATENT DOCUMENTS

WO 2019/034860 A1 2/2019
WO 2020/120998 A2 6/2020

(Continued)

OTHER PUBLICATIONS

Great Britain Search Report and Written Opinion received for GB Application No. 2104391, mailed on Sep. 14, 2021, 6 pages.

(Continued)

*Primary Examiner* — Christopher E Mahoney
(74) *Attorney, Agent, or Firm* — Van Hoven PC; Stefan D. Osterbur; Joshua Van Hoven

(57) ABSTRACT

A shape memory alloy (SMA) actuator assembly (1) comprising: a movable part (100); a support structure (3); one or more SMA wires arranged, on contraction, to tilt the movable part relative to the support structure about two orthogonal axes that are perpendicular to a primary axis (O) of the support structure; and axial translation constrainers (16) configured to limit axial translation of the movable part relative to the support structure along the primary axis of the (Continued)

support structure, wherein the axial translation constrainers are arranged to prevent all points of the movable part from simultaneously reaching their most extreme position along the primary axis of the support structure allowed by the range of possible tilt of the movable part relative to the support structure.

7 Claims, 5 Drawing Sheets

(56) References Cited

FOREIGN PATENT DOCUMENTS

| | | | | |
|---|---|---|---|---|
| WO | 2021/005351 A1 | | 1/2021 | |
| WO | WO-2021001008 A1 | * | 1/2021 | ......... G02B 13/0075 |

OTHER PUBLICATIONS

International Search Report and Written Opinion received for PCT Patent Application No. PCT/GB2022/050775, mailed on Jun. 1, 2022, 11 pages.

* cited by examiner

SMA ACTUATOR ASSEMBLY

CROSS-REFERENCE TO RELATED APPLICATIONS

This application is a national stage application under 35 U.S.C. § 371 of International Application No. PCT/GB2022/050775, filed Mar. 29, 2022, which claims priority of GB Patent Application No. 2104391.4, filed Mar. 29, 2021, the disclosures of each of which are hereby incorporated by reference herein in their entireties.

The present application relates to an actuator assembly, particularly an actuator assembly comprising a plurality of lengths of shape-memory alloy (SMA) wire.

Such an actuator assembly may be used, for example, in a camera to provide optical image stabilization (OIS). Where such a camera is to be incorporated into a portable electronic device such as a mobile telephone, miniaturization can be important.

WO 2010/029316 A2 discloses OIS of a camera apparatus comprising a camera unit that is supported on a support structure by a suspension system. The camera unit is a functional camera and comprises an image sensor and a lens system. OIS is provided by tilting the entire camera unit around axes that are perpendicular to the optical axis. The suspension system allows the tilting of the camera unit.

A device incorporating the actuator assembly may be subjected to an impact, for example when the device is dropped. Such an impact can cause the SMA wires to overextend, which can lead to damage to the SMA wires. The present invention is concerned with protecting the SMA wires from overextension.

According to a first aspect of the present invention, there is provided a SMA actuator assembly comprising a movable part, a support structure, one or more SMA wires arranged, on contraction, to tilt the movable part relative to the support structure about two orthogonal axes that are perpendicular about/to a primary axis of the support structure (i.e. a primary axis of the SMA actuator assembly which is defined with reference to the support structure), and axial translation constrainers configured to limit axial translation of the movable part relative to the support structure along the primary axis of the support structure, wherein the axial translation constrainers are arranged to prevent all points of the movable part from simultaneously reaching their most extreme position along the primary axis of the support structure allowed by the range of possible tilt of the movable part relative to the support structure.

Typical endstops for SMA actuator assemblies limit the maximum height that the movable part can reach along the primary axis of the support structure. The maximum height is independent of the tilt position. The tilt function means that each corner of the movable part has to be allowed to reach high up in order for the tilting to be unhindered by the endstops. The typical endstops allow all points of the movable part from simultaneously reaching their most extreme position along the primary axis of the support structure allowed by the range of possible tilt of the movable part relative to the support structure. By preventing this, the possibility of damage, e.g. overextension of SMA wires, is reduced.

In some embodiments, the axial translation constrainers are arranged to prevent opposing points of the movable part with the primary axis of the support structure between them from simultaneously reaching their most extreme position along the primary axis of the support structure allowed by the range of possible tilt of the movable part relative to the support structure. By preventing opposite sides from simultaneously reaching their most extreme position, the possibility of damage, e.g. overextension of SMA wires, is reduced.

In some embodiments, the axial translation constrainers comprise endstop surfaces of the support structure against which complementary endstop surfaces of the movable part can abut so as to limit movement of the movable part relative to the support structure. The abutment of surfaces provides a robust way to limit axial movement in case of an impact while allowing the necessary tilt movements. The complementary endstop surfaces of the movable part are configured to directly contact the endstop surfaces of the support structure.

In some embodiments, the endstop surfaces decrease in distance from the primary axis of the support structure with increasing distance from the intersection of the two orthogonal axes along the primary axis of the support structure. For example, in some embodiments, the endstop surfaces are (at least substantially) spherical sectors of a sphere centred on the intersection of the two orthogonal axes. The shape of the endstop surfaces allows the axial movement to be restricted over a range of tilt positions. This avoids some tilt positions which could result in a large axial translation in the event of an impact.

In some embodiments, the distance or (minimum) clearance between the endstop surfaces of the support structure and the complementary endstop surfaces of the movable part remains (substantially) constant over the range of possible tilt of the movable part relative to the support structure. The consistent (minimum) clearance allows the axial movement to be similarly restricted regardless of the tilt position.

In some embodiments, the endstop surfaces form an angle of at least 20° with respect to the primary axis of the support structure. This helps to reduce the possibility of the movable part becoming wedged by the endstop surfaces in the event of an impact.

In some embodiments, the axial translation constrainers comprise hooks configured to engage with complementary hooks fixed relative to the movable part. This makes it possible to constrain the axial translation in a way that does not risk blocking light from passing through the movable part by endstop surfaces.

In some embodiments, the hooks are positioned closer to the intersection of the two orthogonal axes than the complementary hooks fixed relative to the movable part. In some embodiments, the hooks are radially inward of the radially outer edge of the movable part. In some embodiments, the hooks are positioned so as to overlap with the intersection of the two orthogonal axes along the primary axis. The hooks can be positioned close to the pivot point so that unwanted axial translation can be tightly constrained.

In some embodiments, the SMA actuator assembly further comprises rotation constrainers configured to limit rotation of the movable part relative to the support structure about the primary axis of the movable part For example, in some embodiments the rotation constrainers form slots of the support structure or movable part into which protrusions of the movable part or support structure fit, such that abutment of the protrusions against walls defining the slots prevents rotation of the movable part relative to the support structure about the primary axis of the movable part. The rotational constrainers can combine with the axial translation constrainers to fully constrain movements that could otherwise damage the SMA actuator assembly.

In some embodiments, the clearance between the protrusions, when the movable part is untilted, and the walls defining the slots increases with increasing distance from the intersection of the two orthogonal axes along the primary axis of the support structure. This allows the rotational movements to be constrained without interfering with the tilt movements that may be required for OIS, for example.

In some embodiments, the (minimum) clearance between the protrusions and the walls defining the slots remains (substantially) constant over the range of possible tilt of the movable part relative to the support structure. This allows the rotational movement to be similarly constrained regardless of the tilt position.

In some embodiments, the axial translation constrainers are positioned radially outward of the movable part.

In some embodiments, the primary axis of the support structure corresponds to the primary axis of the movable part (i.e. the primary axis of the SMA actuator assembly which is defined with reference to the movable part) when the movable part is untilted.

In some embodiments, the one or more SMA wires are operatively connected (e.g. mechanically and electrically connected) between the support structure and the movable part.

In some embodiments, the one or more SMA wires comprise eight SMA wires divided in two groups of four SMA wires, and wherein: two SMA wires are located on each of four sides around the primary axis of the support structure, the four sides extending in a loop around the primary axis of the support structure; the two SMA wires on each of the four sides are inclined with respect to the primary axis of the support structure; the SMA wires of each of the two groups of four SMA wires are arranged with a 2-fold rotational symmetry about the primary axis of the support structure; and one of the two groups of four SMA wires provides a force on the movable part with a component in a first direction along the primary axis of the support structure and the other of the two groups of four SMA wires provides a force on the movable part with a component in a second direction along the primary axis of the support structure, opposite to the first direction along the primary axis of the support structure.

In some embodiments, the one or more SMA wires comprise four SMA wires, and the SMA actuator assembly comprises a biasing element arranged to resist translation of the movable part in a plane perpendicular to the primary axis of the support structure.

In some embodiments, the two orthogonal axes are located between the movable part and a base of the support structure along the primary axis of the support structure.

In some embodiments, the SMA actuator assembly comprises a camera unit fixed to the movable part. In other words, the movable part comprises a camera unit. The camera unit may comprise a camera module fixed to or mounted onto a module carriage. The support structure may comprise a chassis, within which the movable part is provided. The one or more SMA wires may be coupled at its ends to the support structure (e.g. the chassis of the support structure) and/or the movable part (e.g. the camera unit). In some embodiments, the camera unit (e.g. the camera module) comprises an image sensor and a lens assembly. In some embodiments, the primary axis of the support structure corresponds to the primary optical axis of the lens assembly when the movable part is untilted. The constrainers can be used to prevent damage to the camera unit while allowing OIS to be realised.

In some embodiments, the axial translation constrainers are positioned radially outward of the lens assembly. The axial translation can be constrained without undesirably blocking light from reaching the image sensor.

In some embodiments, the image sensor is between the endstop surfaces and the intersection of the two orthogonal axes along the primary axis of the support structure. The endstop surfaces cannot add height to the bottom of the SMA actuator assembly.

In some embodiments, the hooks and the intersection of the two orthogonal axes are at the same side of the image sensor along the primary axis of the support structure. The hooks cannot block any light from reaching the image sensor. The hooks cannot add height to the top of the camera unit.

According to a second aspect of the present invention, there is provided a method comprising using the SMA actuator assembly described above for optical image stabilisation (OIS) and/or autofocussing (AF).

In some embodiments, the movable part comprises an image sensor, a display, a part of a display, an emitter, and/or a part of an emitter. Where this is the case, the SMA actuator assembly can be used for, e.g., super-resolution imaging and/or wobulation.

According to a third aspect of the present invention, there is provided a SMA actuator assembly comprising: a support, a movable part, one or more SMA wires arranged, on contraction, to tilt the movable part relative to the support structure about two orthogonal axes that are perpendicular to a primary axis of the support structure, and axial translation constrainers configured to limit axial translation of the movable part relative to the support structure along the primary axis of the support structure. The axial translation constrainers comprises endstop surfaces of the support structure against which complementary endstop surfaces of the movable part can abut so as to limit movement of the movable part relative to the support structure. The distance or (minimum) clearance between the endstop surfaces of the support structure and the complementary endstop surfaces of the movable part remains (substantially) constant over the range of possible tilt of the movable part relative to the support structure.

The complementary endstop surfaces of the movable part may be configured to directly contact the endstop surfaces of the support structure.

In some embodiments, the endstop surfaces and/or the complementary endstop surfaces are curved or shaped so that the distance or (minimum) clearance between the endstop surfaces of the support structure and the complementary endstop surfaces of the movable part remains (substantially) constant over the range of possible tilt of the movable part relative to the support structure.

In some embodiments, the endstop surfaces decrease in distance from the primary axis of the support structure with increasing distance from the intersection of the two orthogonal axes along the primary axis of the support structure.

In some embodiments, the endstop surfaces and/or the complementary endstop surfaces are curved.

In some embodiments, the endstop surfaces and/or the complementary endstop surfaces are substantially spherical sectors of a sphere centred on the intersection of the two orthogonal axes.

In some embodiments, the one or more SMA wires are operatively connected between the support structure and the movable part.

In some embodiments, the one or more SMA wires comprise eight SMA wires divided in two groups of four SMA wires, and wherein: two SMA wires are located on each of four sides around the primary axis of the support structure, the four sides extending in a loop around the primary axis of the support structure; the two SMA wires on each of the four sides are inclined with respect to the primary axis of the support structure; the SMA wires of each of the two groups of four SMA wires are arranged with a 2-fold rotational symmetry about the primary axis of the support structure; and one of the two groups of four SMA wires provides a force on the movable part with a component in a first direction along the primary axis of the support structure and the other of the two groups of four SMA wires provides a force on the movable part with a component in a second direction along the primary axis of the support structure, opposite to the first direction along the primary axis of the support structure.

In some embodiments, the one or more SMA wires comprises four SMA wires, and the SMA actuator assembly comprises a biasing element arranged to resist translation of the movable part in a plane perpendicular to the primary axis of the support structure.

In some embodiments, the two orthogonal axes are located between the movable part and a base of the support structure along the primary axis of the support structure.

The various features of the aspects of the present invention set out above may be applied equally to other aspects of the present invention.

To allow better understanding, embodiments of the present invention will now be described by way of non-limitative example with reference to the accompanying drawings, in which:

FIG. 1 is a schematic diagram of a SMA actuator assembly;

FIG. 2 schematically illustrates possible degrees of freedom which may be provided by an SMA actuator assembly;

Figure 1:
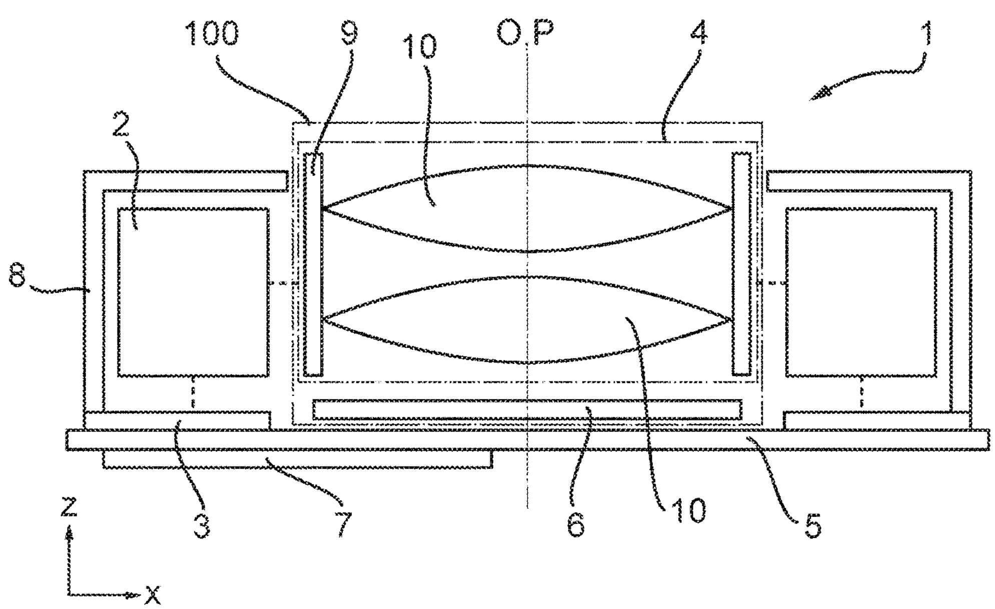

FIG. 1 is a schematic diagram of a SMA actuator assembly 1. The SMA actuator assembly 1 includes a movable part 100, a support structure 3, and an actuator assembly 2 (which may be a SMA actuator assembly 2). The support structure 3 includes a base 5. A camera unit may be fixed to the movable part 100. For example, the movable part 100 may comprise a lens assembly 4 of the camera unit. The movable part 100 (including e.g. the lens assembly 4) may be suspended on the support structure 3 by a SMA actuator 2 comprising SMA wires. The movable part 100 may comprise an image sensor 6 of the camera unit. The image sensor 6 is disposed in front of a front side of the base 5, i.e., the image sensor 6 is interposed between the lens assembly 4 and the base 5.

The SMA actuator 2 supports the movable part 100 (including e.g. the lens assembly 4 and the image sensor 6) in a manner allowing one or more degrees-of-freedom of the movable part 100 (including e.g. the lens assembly 4) relative to the support structure 3. The movable part 100 has a primary axis O, which is herein also referred to as the primary axis of the movable part O. Where the movable part 100 comprises the lens assembly 4 (as e.g. shown in FIGS. 1, 3, 6, 7, 8, 9 and 10) the primary axis O corresponds to the optical axis O of the lens assembly 4.

The SMA actuator assembly 1 includes an integrated circuit (IC) 7, which implements a control circuit, and also a gyroscope sensor (not shown). The support structure 3 also includes a can 8 which protrudes forwardly from the base 5 to encase and protect the other components of the SMA actuator assembly 1.

The lens assembly 4 includes a lens carriage 9 in the form of a cylindrical body supporting two lenses 10 arranged along the optical axis O. In general, any number of one or more lenses 10 may be included. Preferably, each lens 10 has a diameter of up to about 20 mm. The SMA actuator assembly 1 may be comprised in a camera, which may be referred to as a miniature camera.

The lens assembly 4 is arranged to focus an image onto the image sensor 6. The image sensor 6 captures the image and may be of any suitable type, for example, a charge-coupled device (CCD) or a complementary metal-oxide-semiconductor (CMOS) device.

The lenses 10 are supported on the lens carriage 9. Although all the lenses 10 are fixed to the lens carriage 9 in the illustrated examples, the lens carriage 9 may include an actuator assembly (not shown) configured to move at least one of the lenses 10 along the optical axis O relative to the image sensor 6, for example, to provide auto-focussing (AF) or zoom. Such an actuator assembly may be referred to as an 'AF actuator assembly'.

In general, one or more SMA wires are arranged, on contraction, to tilt the movable part 100 relative to the support structure 3 about two orthogonal axes that are perpendicular about the primary axis P of the SMA actuator assembly 1. Primary axis P is herein also referred to as the primary axis of the support structure P, as it is defined with reference to the support structure 3. For example, if a set of right-handed orthogonal axes x, y, z is aligned so that a third axis z is oriented (substantially) parallel to the primary axis P, the one or more SMA wires are arranged, on contraction, to tilt the movable part 100 relative to the support structure 3 about the x and y axes.

OIS functionality may be provided by tilting the movable part 100 (i.e. the lens assembly 4 and the image sensor 6) about an axis parallel to the first axis x and/or about an axis parallel to the second y axis. This is used to provide OIS, compensating for movement of the SMA actuator assembly 1, which may be caused by hand shake etc. Additionally, the lens assembly 4, or at least one lens 10 thereof, may be moved parallel to the optical axis O (parallel to the third axis z) to provide focussing of an image formed on the image sensor 6, for example as part of an automatic focussing (AF) function.

This specification is mainly concerned with examples of SMA actuator assemblies 1 which provide OIS that is based on tilting the movable part 100 (i.e. the lens assembly 4 and the image sensor 6) relative to the support structure 3. AF may be provided by an additional system which may or may not use SMA wires.

Figure 2:
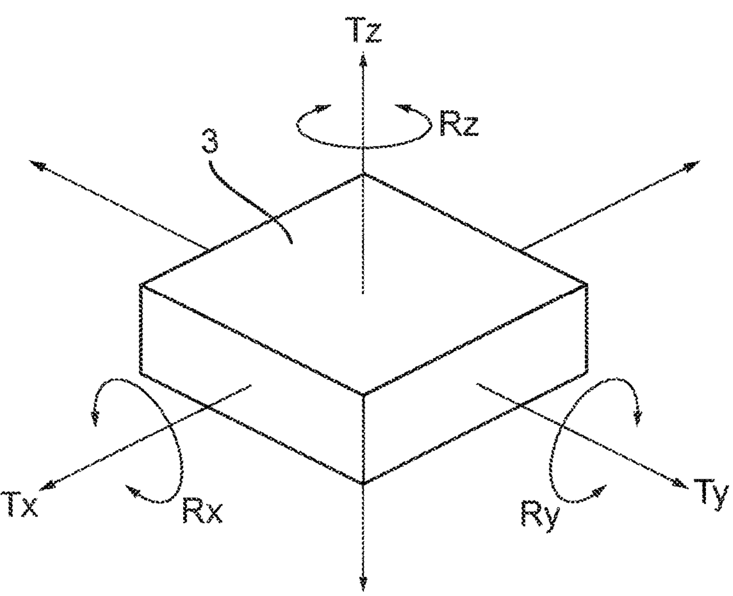

Referring also to FIG. 2, possible types of movement (or degrees of freedom) which may be provided in the SMA actuator assembly 1 are illustrated.

A first degree-of-freedom (DOF) Tx corresponds to movement parallel to the first axis x. A second DOF Ty corresponds to movement parallel to the second axis y. A third DOF Tz corresponds to movement parallel to the third axis z, which is oriented (substantially) parallel to the primary axis P. The third DOF Tz corresponds to movement of the movable part 100 (i.e. lens assembly 4 and the image sensor 6) towards or away from the base 5. The first, second and third axes x, y, z form a right-handed Cartesian coordinate system. A fourth DOF Rx corresponds to rotation (i.e. tilt) about an axis parallel to the first axis x. A fifth DOF Ry corresponds to rotation (i.e. tilt) about an axis parallel to the second axis y. A sixth DOF Rz corresponds to rotation about an axis parallel to the third axis z. In some examples, one or more of the axes may be attached to (and move and/or rotate/tilt with) the movable part 100.

This specification concerns primarily SMA actuator assemblies 1 which provide the motions corresponding to the fourth and fifth DOF Rx, Ry. The fourth and fifth DOF Rx, Ry provide the OIS functionality herein. Other motions may be constrained by the SMA actuator assemblies 1 as described herein. Alternatively, in some embodiments the sixth DOF Rz may be provided, i.e. the movable part may be rotatable about the z-axis. This may further improve the OIS functionality.

The type of drive arrangement which may be included in the SMA actuator 2 may comprise, for example, four SMA wires or eight SMA wires.

For example, when four SMA wires are provided, two of the SMA wires may extend substantially parallel to the first axis x and may be spaced apart in a direction parallel to the second axis y. Contraction of these SMA wires will exert forces in the negative −x direction or the positive +x direction. Two further SMA wires extend substantially parallel to the second axis y and are spaced apart in a direction parallel to the first axis x. Contraction of these SMA wires will exert a force in the negative −y direction or the positive +y direction.

For example, the SMA actuator 2 may comprise the eight SMA wire arrangements described in WO 2011/104518 A1. In other words, the SMA actuator 2 may comprise eight SMA wires that are operatively connected (e.g. mechanically and electrically connected) between the support structure and the movable part. The eight SMA wires may be divided in two groups of four SMA wires. Two SMA wires may be located on each of four sides around the primary axis of the support structure, the four sides extending in a loop around the primary axis of the support structure. The two SMA wires on each of the four sides may be inclined with respect to the primary axis of the support structure. The SMA wires of each of the two groups of four SMA wires may be arranged with a 2-fold rotational symmetry about the primary axis of the support structure. One of the two groups of four SMA wires may provide a force on the movable part with a component in a first direction along the primary axis of the support structure and the other of the two groups of four SMA wires provides a force on the movable part with a component in a second direction along the primary axis of the support structure, opposite to the first direction along the primary axis of the support structure.

Alternatively, for example, the SMA actuator 2 may comprise the four SMA wire arrangements described in WO 2020/074899 A1. In other words, the SMA actuator 2 may comprise four SMA wires that are operatively connected (e.g. mechanically and electrically connected) between the support structure and the movable part, and a biasing element arranged to resist translation of the movable part in a plane perpendicular to the primary axis of the support structure.

Other examples configurations may be used, and further details are provided in WO 2010/029316 A2, WO 2017/055788 A1 and WO 2019/086855 A1, which are incorporated herein in their entirety by this reference.

The forces exerted are controlled by selectively varying the temperatures of the SMA wires. This is achieved by passing selective drive signals through the SMA wires that provide resistive heating. Heating is provided directly by the drive current. Cooling is provided by reducing or ceasing the drive current to allow the SMA wires to cool by conduction, convection and radiation to its surroundings. Further details are also provided in WO 2013/175197 A1, which is incorporated herein by this reference.

Figure 3:
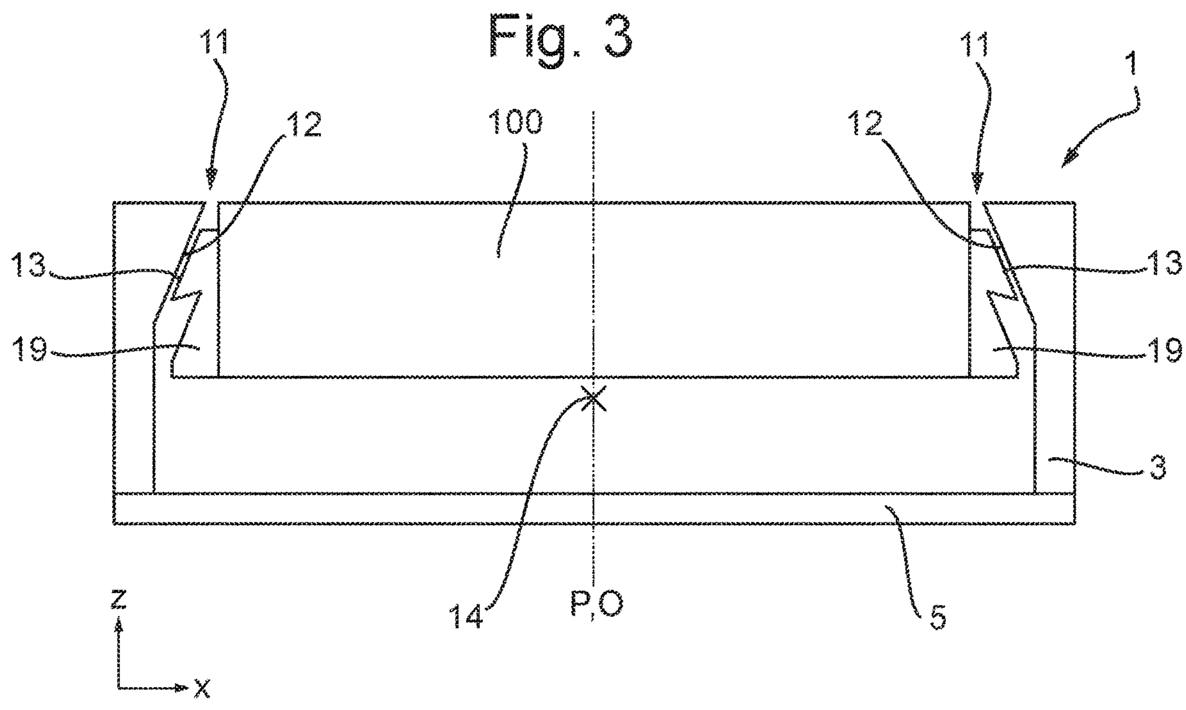
FIG. 3 is a schematic cross sectional view of a SMA actuator assembly.

FIG. 3 is a schematic cross sectional view of a SMA actuator assembly 1. The cross sectional view of FIG. 3 may be through the centre of the SMA actuator assembly 1 (i.e. include the primary axis P), for example. The coordinate system shown in FIG. 1, and described in further detail in relation to FIG. 2, applies in the same orientation in FIGS. 3 to 10.

As shown in FIG. 3, the SMA actuator assembly 1 comprises axial translation constrainers 11 (which may also be referred to as endstops). The axial translation constrainers 11 are configured to limit axial translation of the movable part 100 relative to the support structure 3 along the primary axis P. The axial translation constrainers 11 are also configured to limit axial translation of the movable part 100 relative to the support structure 3 along axes orthogonal to the primary axis P. In this way, the SMA wires can be protected from overextension resulting from, for example, impacts to which a device incorporating the SMA actuator assembly 1 may be subjected (for example being dropped).

As mentioned above, the movable part 100 can tilt relative to the support structure 3. FIG. 3 shows the SMA actuator assembly 1 in its untilted position (which may also be referred to as its neutral position). In the untilted position, the upper surface of the movable part 100 faces in the direction of the primary axis P. In the untilted position, the light-sensitive region/surface of the image sensor 6 is perpendicular to the primary axis P, and the primary axis P and the optical axis O coincide. When the movable part 100 is tilted, the upper surface of the movable part 100 is angled relative to the primary axis P, and the optical axis O is angled relative to the primary axis P (as shown in e.g. FIG. 9).

The SMA actuator assembly 1 is arranged to allow a range of possible tilt of the movable part 100 relative to the support structure 3. For example, there may be an upper limit for the angle that the normal to the upper surface of the movable part 100 can make relative to the primary axis P. The maximum angle may be about 6°, for example. When the movable part 100 is tilted, one edge of the movable part 100 (e.g. one edge of the lens assembly 4) moves further away from the base 5 along the primary axis P.

The axial translation constrainers 11 may be configured to block the movable part 100 at a height that depends on the tilt position. When the movable part 100 is untilted, the axial translation constrainers 11 may block the movable part 100 (e.g. lens assembly 4) at a lower position than when the movable part 100 is tilted.

The edges of the movable part 100 (e.g. lens assembly 4) need not be sharp edges. Alternatively they may be rounded edges or curved edges. When one edge of the movable part (e.g. lens assembly 4) moves further from the base 5 due to tilting, an opposite edge of the movable part 100 (e.g. lens assembly 4) moves towards the base 5 along the primary axis P. The term opposite is used to refer to items being on opposite sides of the optical axis O or the primary axis P, i.e. with the optical axis O or the primary axis P between them.

When the movable part 100 is maximally tilted, the edge or point of the movable part 100 (e.g. lens assembly 4) that is moved away from the base 5 takes its most extreme position along the primary axis P (i.e. in the positive z direction) allowed by the range of possible tilt. For example, the edge or point may have moved over 1 mm from its position when the SMA actuator assembly 1 is in its untilted orientation. The opposite edge or point of the movable part 100 (e.g. lens assembly 4) is as far as it can be in the negative z direction.

The axial translation constrainers 11 are arranged to prevent all points of the movable part 100 from simultaneously reaching their most extreme position along the primary axis P allowed by the range of possible tilt of the movable part 100 relative to the support structure 3.

This is different from known SMA actuator assemblies in which it is possible for all points of the movable part to simultaneously reach their most extreme position along the primary axis allowed by the range of possible tilt of the movable part relative to the support structure. By preventing all points of the movable part 100 from simultaneously reaching their most extreme position along the primary axis P, the possibility of damage to the SMA actuator assembly 1 is reduced. For example, if a device comprising the SMA actuator assembly 1 is dropped or otherwise impacted, then the movable part 100 may move in the positive z direction relative to the support structure 3. This can damage the SMA actuator assembly 1. For example, one or more of the SMA wires may overextend. By preventing all points of the movable part 100 from simultaneously reaching their most extreme position along the primary axis P, the possibility of overextension of the SMA wires is reduced.

Figure 4:
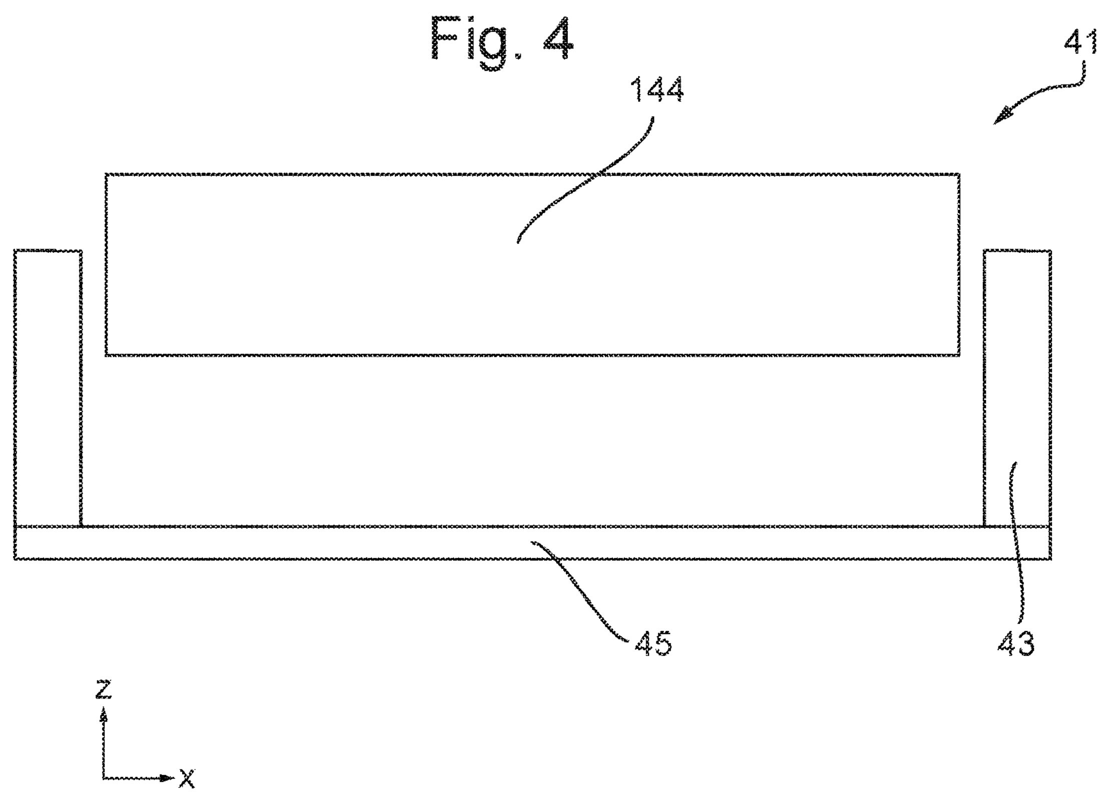
FIG. 4 is a schematic cross sectional view of a comparative SMA actuator assembly.

FIG. 4 is a schematic cross sectional view of a comparative SMA actuator assembly 41. The SMA actuator assembly 41 comprises a movable part 144 (e.g. comprising a lens assembly) which is movable relative to a support structure 43 comprising a base 45. FIG. 4 shows the SMA actuator assembly in its untilted orientation.

The SMA actuator assembly 41 may comprise endstops (not shown) that limit how far one or more parts of the movable part 144 can extend along the primary axis P in the event of a drop scenario. The endstops allow the edges of the movable part 100 (e.g. comprising the lens assembly 41) to take their most extreme position along the primary axis P allowed by the range of possible tilt. In other words the endstops are arranged so as not to interfere with (i.e. reduce) the intended range of possible tilt.

Figure 5:
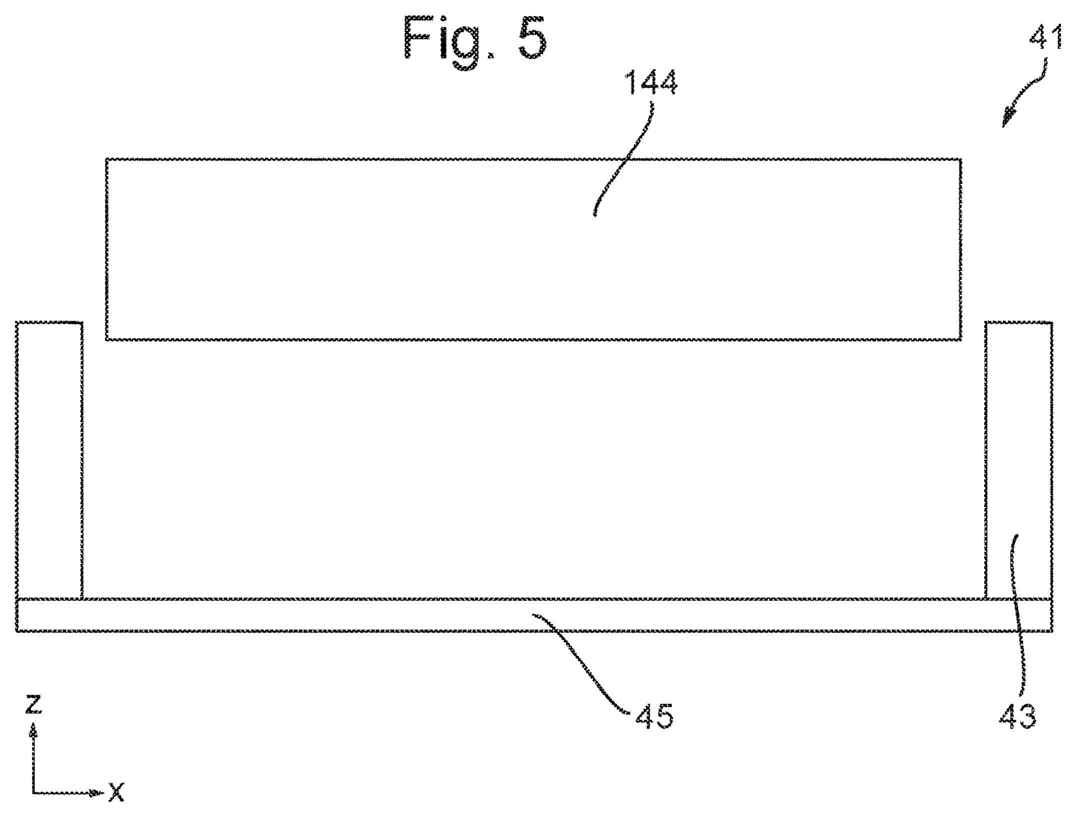
FIG. 5 is a schematic cross sectional view of the comparative SMA actuator assembly of FIG. 4 in a drop scenario.

FIG. 5 is a schematic cross sectional view of the comparative SMA actuator assembly 41 of FIG. 4 in a drop scenario. As shown in FIG. 5, all of the edges of the movable part 144 simultaneously reach their maximum position along the primary axis P. As a result the SMA wires may become overextended or the SMA actuator assembly 41 may be otherwise damaged.

For an SMA actuator 2, it is desirable to prevent significant displacement during drop in all directions to prevent damage of the SMA wire. The present invention can achieve this. The axial translation constrainers 11 may be arranged to prevent opposing edges of the movable part 100 with the primary axis P between them from simultaneously reaching their most extreme position along the primary axis P allowed by the range of possible tilt of the movable part 100 relative to the support structure 3 in the positive z direction (i.e. in a direction along the primary axis P that is away from the base 5 and/or in a direction along the primary axis P that is towards the axial translation constrainers 11). The type of movement of the movable part (e.g. comprising a lens assembly) shown in FIG. 5 during a drop scenario can be minimized. The possibility of overstressing the SMA wires is reduced.

As shown in FIG. 3, the axial translation constrainers 11 may comprise endstop surfaces 12 of the support structure 3 against which complementary endstop surfaces 13 of the movable part 100 can abut so as to limit movement of the movable part 100 relative to the support structure 3. When the movable part 100 is tilted, the complementary endstop surfaces 13 move past the endstop surfaces 12 without abutting. The axial translation constrainers 11 do not hinder the tilting function of the SMA actuator assembly 1. However, if there is an impact which causes the movable part 100 to move in the positive z direction, then the complementary endstop surfaces 13 of the movable part 100 abut against (i.e. come into contact with) the endstop surfaces 12 of the support structure 3. The abutment prevents the movable part 100 from moving further in the positive z direction.

FIG. 3 shows the SMA actuator assembly 1 in its untilted orientation. In the event of an impact, the movable part 100 may move in the positive z direction until the axial translation constrainers 11 stop the movement. The movable part 100 may remain untilted. If the movable part 100 is tilted when the impact occurs, the movable part 100 may move in the positive z direction until the axial translation constrainers 11 stop the movement. The movable part 100 may remain tilted. Whichever side of the movable part 100 (or e.g. the lens assembly 4) is highest (i.e. furthest in the positive z direction) before the impact remains the highest edge after the impact.

This is different from the comparative SMA actuator assembly 41 shown in FIGS. 4 and 5. With such a SMA actuator assembly 41, regardless of whether the movable part 144 (e.g. including the lens assembly) is tilted before the impact, the position of the movable part 144 after the impact is as shown in FIG. 5, i.e. untilted but in its most extreme position along the primary axis P.

FIG. 3 shows endstop surfaces 12 on opposite sides of the movable part 100. There may be a plurality of endstop surfaces 12 provided around the movable part 100. For example, there may be four endstop surfaces 12 (with corresponding complementary endstop surfaces 13). Alternatively there may be two, three or five or more endstop surfaces 12.

The endstop surfaces 12 may be regularly distributed around the movable part 100. The movable part 100 may have a substantially rectangular, for example substantially square, shape in plan view. An endstop surface 12 and corresponding complementary surface 13 may be provided at each of four sides of the movable part 100. The endstop surface 12 may be positioned in the middle of each side. Alternatively, two or more endstop surfaces 12 may be provided on each side.

The axial translation constrainers 11 may be positioned radially outward of the movable part 100 (or e.g. the lens assembly 4). The axial translation constrainers 11 are arranged so as not to undesirably block light from passing through the movable part 100 and e.g. the lens assembly 4.

The endstop surfaces 12 may extend along at most 50%, optionally at most 20% and optionally at most 10% of the sides of the movable part 100 (in the x and y directions). The endstop surfaces 12 may extend along at least 10% and optionally at least 20% of the sides of the movable part 100 (in the x and y directions). The endstop surfaces 12 may extend along at most 50%, optionally at most 20% and optionally at most 10% of the depth of the movable part 100 (in the z direction). The endstop surfaces 12 may extend along at least 10% and optionally at least 20% of the depth of the movable part 100 (in the z direction). The endstop surfaces 12 may be large enough such that even at the maximum tilt position, the complementary endstop surfaces 13 face the endstop surfaces 12. This allows the axial translation constrainers 11 to constrain axial translation of the movable part 100 even when a drop event occurs during maximum tilt.

The two orthogonal axes x, y around which the movable part 100 may tilt intersect with each other. The intersection point may be referred to as the pivot point 14. The primary axis P also extends through the pivot point 14. As shown in FIG. 3, the pivot point 14 may be near an underside of the movable part 100. The pivot point 14 may be between the image sensor 6 and the base 5. The pivot point 14 may be between the movable part 100 and the base 5.

The pivot point 14 may be fixed, for example to the base 5. By providing that the pivot point 14 is fixed, the pivot point 14 may help to prevent the movable part 100 moving downwards too far, i.e. in the negative z direction. A suspension system comprising one or more flexures or springs may be provided to help prevent the movable part 100 moving downwards too far, i.e. in the negative z direction. The axial translation constrainers 11 are configured to prevent too much movement upwards, i.e. in the positive z direction. The image sensor 6 may be between the endstop surfaces 12 and the intersection of the two orthogonal axes x, y along the primary axis P. Alternatively, the pivot point 14 may be a virtual pivot point, i.e. defined solely by the tilt functionality of the movable part 100 due to actuation by the SMA wires.

As shown in FIG. 3, the endstop surfaces 12 may decrease in distance from the primary axis P with increasing distance from the intersection of the two orthogonal axes x, y along the primary axis P. This is shown in FIG. 3 by the angle of the endstop surfaces 12 and the complementary endstop surfaces 13 towards the primary axis P as the surfaces extend in the positive z direction away from the pivot point 14. This allows the axial translation constrainers 11 to take into account the tilt of the movable part 100. As the movable part 100 tilts, there remains a consistent gap from the movable part 100 (e.g. the lens assembly 4) to the endstop surfaces 12. As a result, in the event of a drop, the axial movement of the movable part (including the lens assembly 4) may be significantly constrained regardless of the amount of tilt before the drop event.

The axial translation constrainers 11 may be arranged such that the distance between the endstop surfaces 12 of the support structure 3 and the complementary endstop surfaces 13 of the movable part 100 remains substantially constant over the range of possible tilt of the movable part 100 relative to the support structure 3. The distance (or clearance) between the endstop surfaces 12 of the support structure 3 and the complementary endstop surfaces 13 of the movable part 100 defines how far the movable part 100 (including the lens assembly 4) can move axially in the event of an impact. By having the clearance substantially constant, the potential axial movement in the event of an impact is substantially constant regardless of the amount of tilt. This helps to protect the SMA wires in a way that is independent of the tilt position of the SMA actuator assembly 1. Alternatively, the distance may vary while still allowing a good level of protection in the event of an impact such as a drop.

Figure 6:
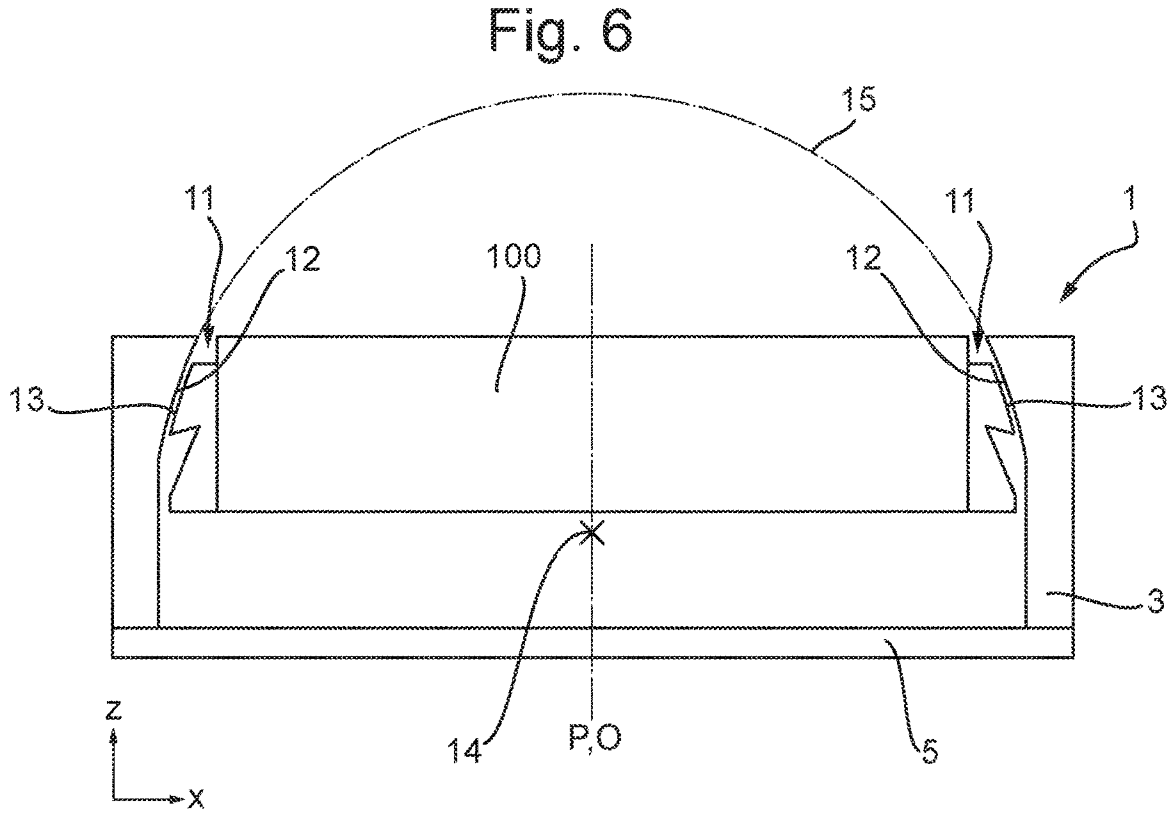
FIG. 6 is a schematic cross sectional view of the SMA actuator assembly of FIG. 3.

FIG. 6 is a schematic cross sectional view of the SMA actuator assembly 1 of FIG. 3. FIG. 6 shows as a dashed line part of the outline 15 of a sphere centred on the pivot point 14. As shown in FIG. 6, the endstop surfaces 12 may be spherical sectors of a sphere centred on the intersection of the two orthogonal axes x, y, i.e. the pivot point 14 (or near the pivot point 14). Each endstop surface 12 may be a spherical surface. This enables the SMA actuator 2 to rotate through its motion without clashing. The complementary endstop surfaces 13 may have the same type of shape as the endstop surfaces 12. The complementary endstop surfaces 13 may be spherical surfaces centred on the pivot point 14 or near the pivot point 14. The imaginary sphere that includes the complementary endstop surfaces 13 is slightly smaller than the imaginary sphere that includes the endstop surfaces 12. This allows a clearance between the surfaces of the axial translation constrainers 11.

However, it is not essential for the endstop surfaces 12 to be spherical sectors. For example, alternatively the endstop surfaces 12 may be flat planes that are angled towards the primary axis P in the positive z direction. An increased clearance between the endstop surfaces 12 and the complementary surfaces 13 could be provided. Flat planes may decrease the possibility of the lens assembly undesirably wedging against the endstop surfaces 12 in the event of an impact forcing the movable part 100 against the endstop surfaces 12. As a further alternative, the endstop surfaces 12 may be curved non-spherical surfaces.

The endstop surfaces 12 may form an angle of at least 20°, and optionally at least 30° with respect to the primary axis P. A tangent to the endstop surface 12 may form an angle of at least 20°, and optionally at least 30° with respect to the primary axis P. The tangent at the radially inward part of the endstop surface 12 may form an angle of at least 20°, and optionally at least 30° with respect to the primary axis P. This can help to reduce the possibility of the movable part 100 (including e.g. the lens assembly 4) wedging against the endstop surfaces 12 during an impact. If the angle between the endstop surfaces 12 and the primary axis P is too shallow, then the movable part 100 (including e.g. the lens assembly) could get stuck when it is forced to abut against the endstop surfaces 12.

The tangent at the radially outer part of the endstop surface 12 may form an angle of at least 20°, and optionally at least 30° with respect to the primary axis P. This can further reduce the possibility of the movable part 100 (including e.g. the lens assembly) getting stuck against the endstop surfaces 12. In general, the angle between the endstop surface 12 and the primary axis P may increase in the positive z direction and in the radially inward direction. By providing the minimum limit on the angle at the radially outer part of the endstop surface 12, then all of the endstop surface 12 that the movable part 100 (or e.g. the lens assembly 4) could come into contact with satisfies the same minimum angle requirement. This prevents the movable part 100 (including e.g. the lens assembly 4) from becoming wedged against any part of the endstop surfaces 12.

Figure 8:
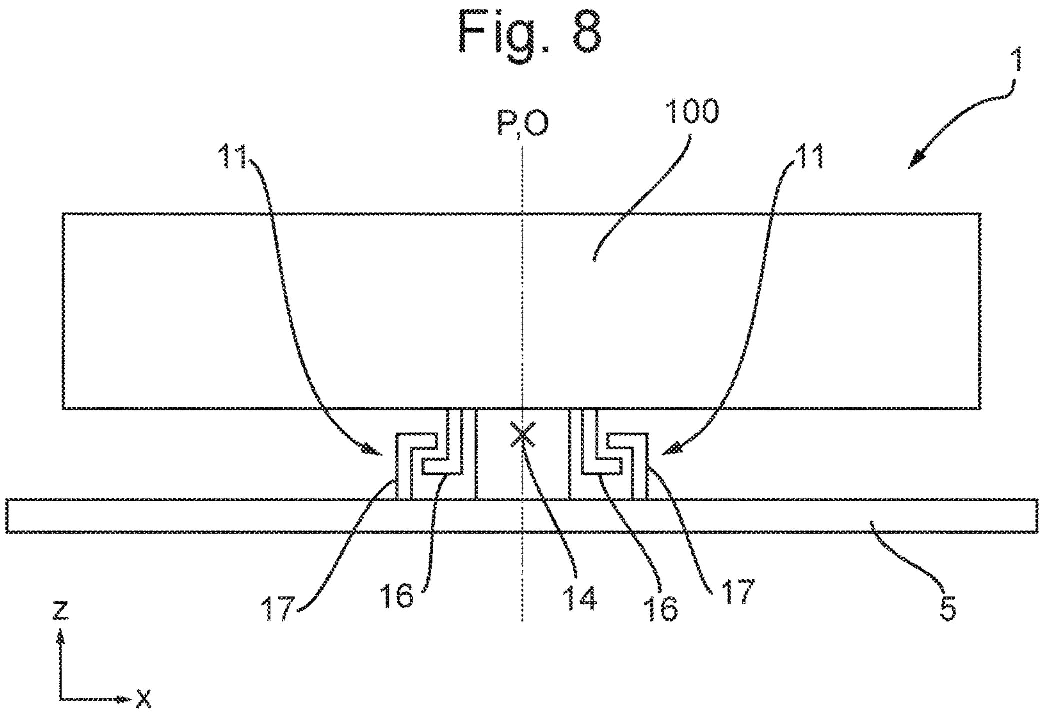
FIG. 8 is a schematic cross sectional view of a SMA actuator assembly.

FIG. 8 is a schematic cross sectional view of a SMA actuator assembly 1. The features shown in FIG. 8 may be provided in combination with the features described above and shown in FIG. 3, for example.

As shown in FIG. 8, the axial translation constrainers 11 may comprise hooks 17 (which may also be referred to as tethers). The hooks 17 may be part of the support structure 3. The hooks 17 may be fixed to the base 5. The hooks 17 are configured to engage with complementary hooks 16 fixed relative to the movable part 100. The hooks 17 may be provided in addition to, or as an alternative to, the endstop surfaces 12.

Figure 9:
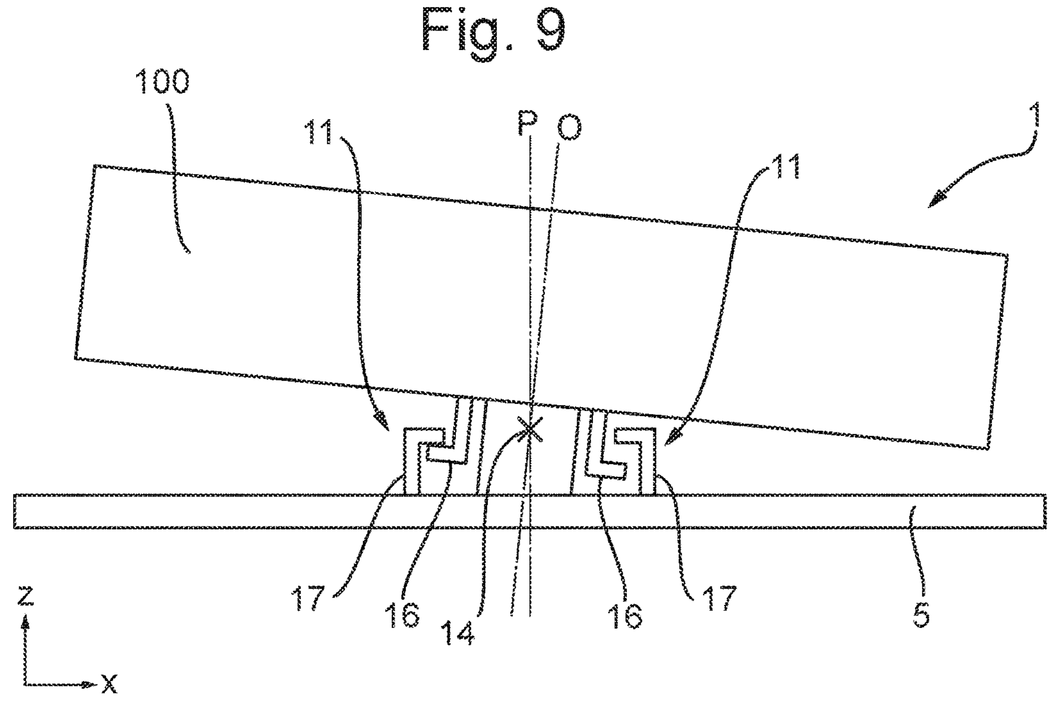
FIG. 9 is a schematic cross sectional view of the SMA actuator assembly of FIG. 8 in a tilted orientation.

The hooks 17 are configured to constrain upwards motion of the movable part 100. The hooks 17 are configured to allow for the movable part 100 to tilt with respect to the support structure 3. FIG. 9 is a schematic cross sectional view of the SMA actuator assembly 1 of FIG. 8 in a tilted orientation. The hooks 17 do not interfere with the tilting function.

Figure 10:
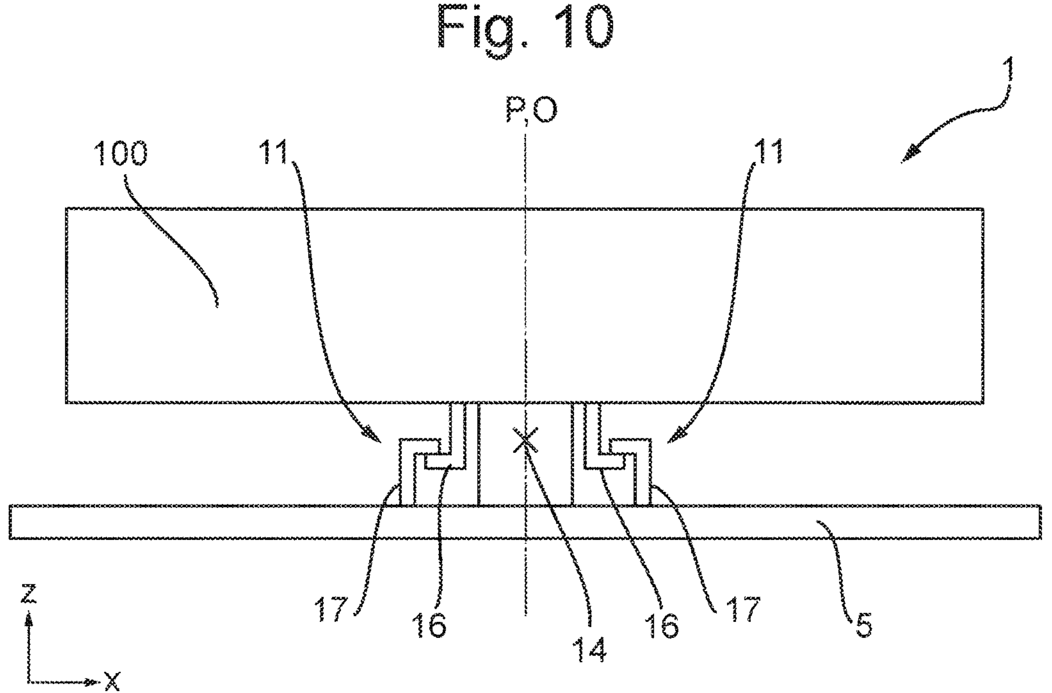
FIG. 10 is a schematic cross sectional view of the SMA actuator assembly of FIG. 8 in a drop scenario.

FIG. 10 is a schematic cross sectional view of the SMA actuator assembly 1 of FIG. 8 in a drop scenario. As shown in FIG. 10, in the event of a drop or another impact, the hooks 17 engage with the complementary hooks 16 such that the axial translation constrainers 11 constrain axial translation of the movable part 100 in the positive z direction.

The hooks 17 may be provided at the underside of the movable part 100. The hooks 17 and the intersection of the two orthogonal axes x, y may be at the same side of the image sensor 6 along the primary axis P. The hooks 17 cannot interfere with any light to be received by the lens assembly 4 from the upper side of the movable part 100. The hooks 17 do not add height the to the upper side of the SMA actuator assembly 1. This means that the SMA actuator assembly 1 can be protected while maintaining its compact size.

The hooks 17 may be positioned closer to the intersection of the two orthogonal axes x, y than the complementary hooks 16 fixed relative to the movable part 100. Alternatively, the hooks 17 may be positioned further from the pivot point 14 than the complementary hooks 16 fixed relative to the movable part 100.

As shown in FIG. 8, the hooks 17 may be radially inward of the radially outer edge of the movable part 100. As shown in FIG. 8, the hooks 17 may be positioned so as to overlap with the intersection of the two orthogonal axes x, y along the primary axis P.

The hooks 17 can be much closer to the pivot point 14 (under the image sensor 6) compared to the endstop surfaces 12 shown in FIG. 3. This helps to keep the allowed z displacement (in a drop event) within acceptable limits. This helps to reduce the possibility of the SMA actuator assembly 1 being damaged.

As shown in FIG. 8, hooks 17 may be provided on opposite sides of the pivot point 14. There may be more than two hooks 17 (with complementary hooks 16), i.e. more than two pairs of hooks. For example, there may be four pairs of hooks around the pivot point. The pairs of hooks may be distributed regularly around the pivot point, for example at 90° intervals. Alternatively, three or five or more pairs of hooks may be provided.

Figure 7:
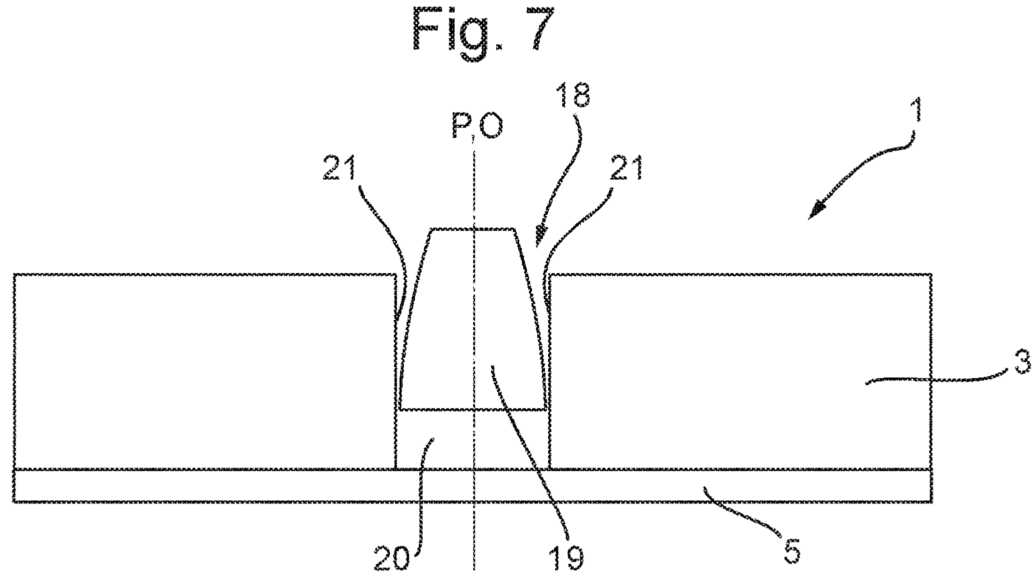
FIG. 7 is a schematic alternative cross sectional view of the SMA actuator assembly of FIG. 3.

FIG. 7 is a schematic alternative cross sectional view of the SMA actuator assembly 1 of FIG. 3. The cross sectional view of FIG. 7 is offset from the centre along one of the orthogonal axes x, y, for example. The features shown in FIG. 7 could be combined with the features shown in FIG. 8.

As shown in FIG. 7, the SMA actuator assembly 1 may comprise rotation constrainers 18 (which may also be referred to as rotational endstops). The rotation constrainers 18 are configured to limit rotation of the movable part 100 relative to the support structure 3 about the primary axis O (i.e. the primary axis of the movable part 100 and/or the optical axis O of the lens assembly 4).

The rotation constrainers 18 may form slots 20 of the support structure 3 or movable part 100 into which protrusions 19 of the movable part 100 or support structure 3 fit. Abutment of the protrusions 19 against walls 21 defining the slots 20 prevents rotation of the movable part 100 relative to the support structure 3 about the primary axis O. FIG. 7 shows an example in which the slots 20 are formed in the support structure 3. The protrusions 19 are fixed to the movable part 100. For, example the protrusions 19 may comprise the complementary endstop surfaces 13, as shown in FIG. 3.

Alternatively, the protrusions 19 may be part of the support structure 3 and the slots 20 may be formed in the movable part 100. The endstop surfaces 12 may be formed by the protrusions 19 that are part of the support structure 3. By providing an endstop surface on the same protrusion 19 that forms part of the rotational constrainers 18, the SMA actuator assembly 1 can be kept small.

As shown in FIG. 7, there is a clearance between the walls 21 and the protrusions 19. When the movable part 100 rotates about the primary axis O (which is aligned with the primary axis P when the movable part 100 is in the untilted position), the clearance decreases until the protrusions 19 come into contact with the walls 21 such that the rotation is constrained.

As shown in FIG. 7, the clearance between the protrusions 19, when the movable part 100 is untilted, and the walls 21 defining the slots 20 may increase with increasing distance from the intersection of the two orthogonal axes x, y along the primary axis P. FIG. 7 shows the SMA actuator assembly in an untilted position. The protrusion 19 tapers in the positive z direction. This allows the movable part 100 to tilt without the rotational constrainers 18 interfering. Even in a tilted position, the rotational constrainers 18 can prevent unwanted rotation about the primary axis O.

The clearance between the protrusions 19 and the walls 21 defining the slots 20 may remain substantially constant over the range of possible tilt of the movable part 100 relative to the support structure 3. For example, the tapering of the protrusion 19 may be provided such that at any possible tilt angle, the minimum clearance between the protrusion 19 and the wall 21 is the same. Of course when the movable part 100 is rotated about the primary axis O, the (minimum) clearance reduces. However, when there is no rotation about the primary axis O, the (minimum) clearance is the same regardless of the tilt position (i.e. tilt about the x and y axes).

The rotational constrainers 18 combined with the axial translation constrainers 11 are configured to fully constrain the movement during a drop event.

The rotational constrainers 18 may be provided centrally on the sides of the movable part 100. Alternatively, the rotational constrainers 18 may be positioned at the corners of the movable part 100.

Various numbers of rotational constrainers 18 are possible. There may be four rotational constrainers 18, for example one at each side of a rectangular movable part 100 (or e.g. a rectangular lens assembly). Alternatively, two, three or five or more rotational constrainers 18 may be provided.

Various modifications may be made to the specific examples described above. For example, as mentioned above, the actuator arrangement that moves the movable part 100 relative to the support structure 3 may comprise SMA wires. However, the actuator arrangement may be of other types, for example comprising a voice coil motor (VCM). In general, the SMA actuator assembly may be an actuator assembly, and instead of the one or more SMA wires, the actuator assembly may comprise one or more actuator components arranged, on actuation, to tilt the movable part relative to the support structure about two orthogonal axes that are perpendicular about a primary axis of the support structure. As another example, as mentioned above, the movable part may comprise both the lens assembly 4 and the image sensor 6. Alternatively, the movable part may comprise the lens assembly 4 and the image sensor 6 may be provided separately from the movable part, e.g. be fixed relative to the support structure 3.

The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA actuator assembly herein described may correspond to (part of) an illumination source which may be for use in a 3D sensing system such as described in WO2020/030916 or in an augmented reality (AR) display system.

Where the movable part comprises an emitter or a display (or a part thereof), the movable part may be moved to achieve wobulation, for example for the display of a super-resolution image (i.e. an image having a resolution higher than that of the intrinsic resolution of the emitter or display). In this case, a high-resolution image is displayed (or projected) by displaying a number of lower-resolution images at different positions in rapid succession. The image displayed at each position is a lower-resolution image formed of a subset of pixels of the high-resolution image. The movable part may be moved between the positions in a repeated pattern at a high frequency, for example greater than 30 Hz, preferably greater than 60 Hz, further preferably greater than 120 Hz. The succession of lower-resolution images is thus perceived by the human eye as one high-resolution image.

The display may be a display panel, for example a LCOS (liquid crystal on silicon) display, a microLED display, a digital micromirror device (DMD) or a laser beam scanning (LBS) system.

The emitter is configured to emit radiation (visible light or non-visible radiation, e.g. near infrared (NIR) light, short-wave infrared (SWIR) light). The emitter may comprise one or more LEDs or lasers, for example VCSELs (vertical-cavity surface-emitting lasers) or edge-emitting lasers. The emitter may comprise a VCSEL array. The emitter may otherwise be referred to as an illumination source and/or may comprise an image projector.

The primary axis of the support structure is defined with reference to the support structure. In the case that the movable part comprises a display, the display may define a plane and the primary axis of the support structure may be perpendicular to the plane defined by the display when the movable part is in the untilted position (i.e. when the SMA wires have not tilted the movable part from its default position). In any case, the primary axis of the support structure may be aligned with a general direction in which light is emitted from the display. In the case that the movable part comprises an emitter, the emitter may define a plane and the primary axis of the support structure may be perpendicular to the plane defined by the emitter when the movable part is in the untilted position. For example, the emitter may comprise a VCSEL array and, when the movable part is untilted, the primary axis of the support structure may be perpendicular to the plane of the VCSEL array. In any case, the primary axis of the support structure may be aligned with a general direction in which radiation is emitted by the emitter.

Those skilled in the art will recognise that the present invention has a broad range of applications, and that the embodiments may take a wide range of modifications without departing from any inventive concept as defined in the appended claims.

The invention claimed is:

1. A shape memory alloy (SMA) actuator assembly comprising:

a support structure;

a movable part;

one or more SMA wires arranged, on contraction, to tilt the movable part relative to the support structure about two orthogonal axes that are perpendicular to a primary axis of the support structure;

axial translation constrainers configured to limit axial translation of the movable part relative to the support structure along the primary axis of the support structure;

wherein the axial translation constrainers comprise endstop surfaces of the support structure against which complementary endstop surfaces of the movable part can abut so as to limit movement of the movable part relative to the support structure; and wherein the endstop surfaces and/or the complementary endstop surfaces are curved such that the distance between the endstop surfaces of the support structure and the complementary endstop surfaces of the movable part remains substantially constant over the range of possible tilt of the movable part relative to the support structure.

2. The SMA actuator assembly of claim 1, wherein the endstop surfaces decrease in distance from the primary axis of the support structure with increasing distance from the intersection of the two orthogonal axes along the primary axis of the support structure.

3. The SMA actuator assembly of claim 1, wherein the one or more SMA wires are operatively connected between the support structure and the movable part.

4. The SMA actuator assembly of claim 1, wherein the two orthogonal axes are located between the movable part and a base of the support structure along the primary axis of the support structure.

5. The SMA actuator assembly of claim 1, wherein the endstop surfaces and/or the complementary endstop surfaces are substantially spherical sectors of a sphere centred on the intersection of the two orthogonal axes.

6. The SMA actuator assembly of claim 1, wherein the one or more SMA wires comprise eight SMA wires divided in two groups of four SMA wires, and wherein:

two SMA wires are located on each of four sides around the primary axis of the support structure, the four sides extending in a loop around the primary axis of the support structure;

the two SMA wires on each of the four sides are inclined with respect to the primary axis of the support structure;

the SMA wires of each of the two groups of four SMA wires are arranged with a 2-fold rotational symmetry about the primary axis of the support structure; and one of the two groups of four SMA wires provides a force on the movable part with a component in a first direction along the primary axis of the support structure and the other of the two groups of four SMA wires provides a force on the movable part with a component in a second direction along the primary axis of the support structure, opposite to the first direction along the primary axis of the support structure.

7. The SMA actuator assembly of claim 1, wherein the one or more SMA wires comprises four SMA wires, and the SMA actuator assembly comprises a biasing element arranged to resist translation of the movable part in a plane perpendicular to the primary axis of the support structure.

* * * * *